Patented Sept. 17, 1935

2,015,043

UNITED STATES PATENT OFFICE 2,015,043

PREPARATION OF EMULSIONS

William M. Stratford, New York, N. Y., assignor to The Texas Company, New York, N. Y., a corporation of Delaware No Drawing. Application February 17, 1933, Serial No. 657,259

5 Claims. (Cl. 252—6)

This invention relates to the preparation of emulsions and particularly to emulsions of water with petroleum hydrocarbons of high specific gravities.

More specifically, my invention relates to the preparation of emulsions of water or aqueous media with petroleum hydrocarbon oils having specific gravities equal to, or greater than water. The emulsions may be prepared by any of the known methods for the preparation of oil and water emulsions, such as by mechanical agitation or dispersion, either with or without dispersing agents such as soaps, finely divided solids, or the like.

In the cracking of petroleum hydrocarbons there are produced certain heavy by-product oils which are usually resubmitted to the pyrolytic cracking conditions. Certain fractions obtained from such oils have been found to have extremely high specific gravities, which may equal or exceed that of water. For example, the tests of two distillate fractions obtained by distilling the heavy residual oils from a pyrolytic cracking were as follows:

|  | Fraction #1 | Fraction #2 |
|---|---|---|
| Gravity Baumé | 8.4 | 9.9 |
| Specific gravity | 1.011 | 1.000 |
| Flash Pensky Martin ° F | 124 | 118 |
| Flash ° F | 200 | 185 |
| Fire ° F | 305 | 295 |
| Vis. univ. at 100° F | 183 | 163 |
| Vis. univ. at 210° F | 42 | 43 |
| Pour ° F | 75 | 80 |
| Neutralization number | .12 | .11 |

When high gravity hydrocarbon oils such as those described above are emulsified with water, they have the characteristic of yielding emulsions which are free from the disadvantage of the oil separating out as a separate layer. This is traceable to the fact that because the oil and the aqueous phases have approximately the same specific gravities, the force of gravity upon both components is the same and there is no separation into distinct layers. This is an important factor since commercial emulsions are usually examined and rated on the uniformity of their constitution, those emulsions which are stable or non-creaming being the most desirable.

The characteristics of these oils are such that they are ideally suited for the preparation of insecticidal and fungicidal emulsions. The high viscosity indicates the presence of extremely high molecular weight hydrocarbons which, when used for spraying plant life, do not exert any undesirable physiological actions on the plant structures and the oils may be used without the danger of burning the plant tissues.

An emulsion of the above oils with water, suitable for use as an insecticide and fungicide, may be quite readily prepared by submitting a mixture of water and the oil to the action of a colloid mill. The very viscous emulsion produced in this manner may be diluted with water until the concentration of oil is equal to from 1 to 10% of the total volume.

In preparing these insecticidal and fungicidal emulsions, it may be desirable to stabilize the emulsion by compounding therewith a small quantity of a finely divided solid such as fuller's earth, clay, charcoal or bauxite. Under such conditions where the use of finely divided materials is not desirable, the use of any one of the numerous well-known emulsifying agents may find application. For example, the alkali metal salts of the fatty acids, naphthenic acids and sulfonic acids, as well as certain of the fatty acid salts of triethanolamine and the like, may be used.

The application of the high gravity oils of the type described is not restricted alone to the preparation of insecticides and fungicides but may also be used for the preparation of cutting oil emulsions. Although an emulsion of such heavy oil and water may be used as an efficient lubricant in the forming and fabrication of metals, good results may also be obtained by compounding such oils with sulfurized hydrocarbons.

Highly efficient cutting oil emulsions may be prepared by using an oil having the characteristics given in column 1 in the above table and emulsifying it with water in a colloid mill. The heavy emulsion obtained in this way may be diluted with further quantities of water to yield a milk-like fluid emulsion which is in all respects highly satisfactory as a cutting oil fluid. The high temperatures which may be encountered in the machining of metals does not materially affect the stability of such cutting fluid nor does it in any way deteriorate the oil which is emulsified therein.

By using a heavy sulfurized hydrocarbon oil as a diluent for the oil or high specific gravity and then emulsifying the resultant mixture with water, there may be produced an emulsion suitable for use as a cutting oil fluid when diluted to the proper fluidity, and which is especially suitable for use where exceedingly high working pressures between the tools and the metal operated upon exist.

The cutting oil emulsions may be stabilized by admixing with the oil and water any of the well-known soap emulsifying agents previously described. It is desirable, however, that these emulsifying agents be stable under the conditions of temperature and pressure which exist in the cutting area.

Obviously many modifications and variations of the invention, as hereinbefore set forth, may be made without departing from the spirit and scope thereof, and therefore only such limitations should be imposed as are indicated in the appended claims.

I claim:

1. An emulsion comprising water, a petroleum fraction having a specific gravity substantially equal to water, and an emulsifying agent, said emulsion being substantially non-creaming.

2. An emulsion comprising water, a petroleum fraction having a specific gravity substantially equal to water, and a comminuted solid emulsifying agent, said emulsion being substantially non-creaming.

3. An emulsion comprising water, a petroleum fraction having a specific gravity substantially equal to water, and an emulsifying agent of the character of finely divided fuller's earth and clay, said emulsion being substantially non-creaming.

4. An emulsion comprising water, a petroleum fraction having a specific gravity substantially equal to water, and an alkali metal soap emulsifying agent, said emulsion being substantially non-creaming.

5. An emulsion according to claim 1 in which the petroleum fraction is a fraction derived from residues resulting from the cracking of oils.

WILLIAM M. STRATFORD.